United States Patent [19]

Sjöstedt

[11] Patent Number: 4,832,352
[45] Date of Patent: May 23, 1989

[54] PISTON ROD SEAL

[75] Inventor: Carl-Göran Sjöstedt, Bara, Sweden

[73] Assignee: United Stirling AB, Bara, Sweden

[21] Appl. No.: 200,632

[22] Filed: May 26, 1988

Related U.S. Application Data

[63] Continuation of Ser. No. 30,614, Mar. 27, 1987, abandoned.

[51] Int. Cl.⁴ .......................... F16J 15/16; F16J 15/56
[52] U.S. Cl. .................................... 277/114; 92/86.5;
     92/153; 92/168; 277/102; 277/212 C
[58] Field of Search ............... 277/102, 103, 114, 115,
     277/116, 117, 212 C, 142, 143; 92/165 R, 168,
     86.5, 153

[56] References Cited

U.S. PATENT DOCUMENTS

| | | | |
|---|---|---|---|
| 877,706 | 1/1908 | Duffy | 277/115 X |
| 895,038 | 8/1908 | Otto | 277/102 X |
| 2,847,262 | 8/1958 | Gratzmuller | 277/102 X |
| 3,004,783 | 10/1961 | Webb | 277/103 |
| 3,059,937 | 10/1962 | Wettstein | 277/116 X |
| 3,096,096 | 7/1963 | Banks | 277/117 |
| 3,602,520 | 8/1971 | Wallis . | |
| 3,828,897 | 8/1974 | Randyal | 277/102 X |
| 3,973,782 | 8/1976 | Evans | 277/142 |
| 4,146,237 | 3/1979 | Bergman . | |
| 4,251,081 | 2/1981 | Skoog | 277/114 X |

FOREIGN PATENT DOCUMENTS

| | | |
|---|---|---|
| 334784 | 5/1971 | Sweden . |
| 1295808 | 11/1972 | United Kingdom . |
| 1342707 | 1/1974 | United Kingdom . |

*Primary Examiner*—Allan N. Shoap
*Attorney, Agent, or Firm*—Finnegan, Henderson, Farabow, Garrett & Dunner

[57] ABSTRACT

This invention relates to a piston rod seal in which the rod along which leakage should be avoided is surrounded by a gland of a plastically deformable material. The gland is mounted at the high pressure side of a wall through which the piston rod is passed and is provided with a conical extension diverging towards the high pressure side of the seal and acting as a pump for returning oil applied to the piston rod at the low pressure side of the piston rod and drawn through the gland. The gland is provided with a radial flange axially clamped between a metal ring and a spring support. An O-ring is mounted between the wall, the ring, and the gland.

7 Claims, 1 Drawing Sheet

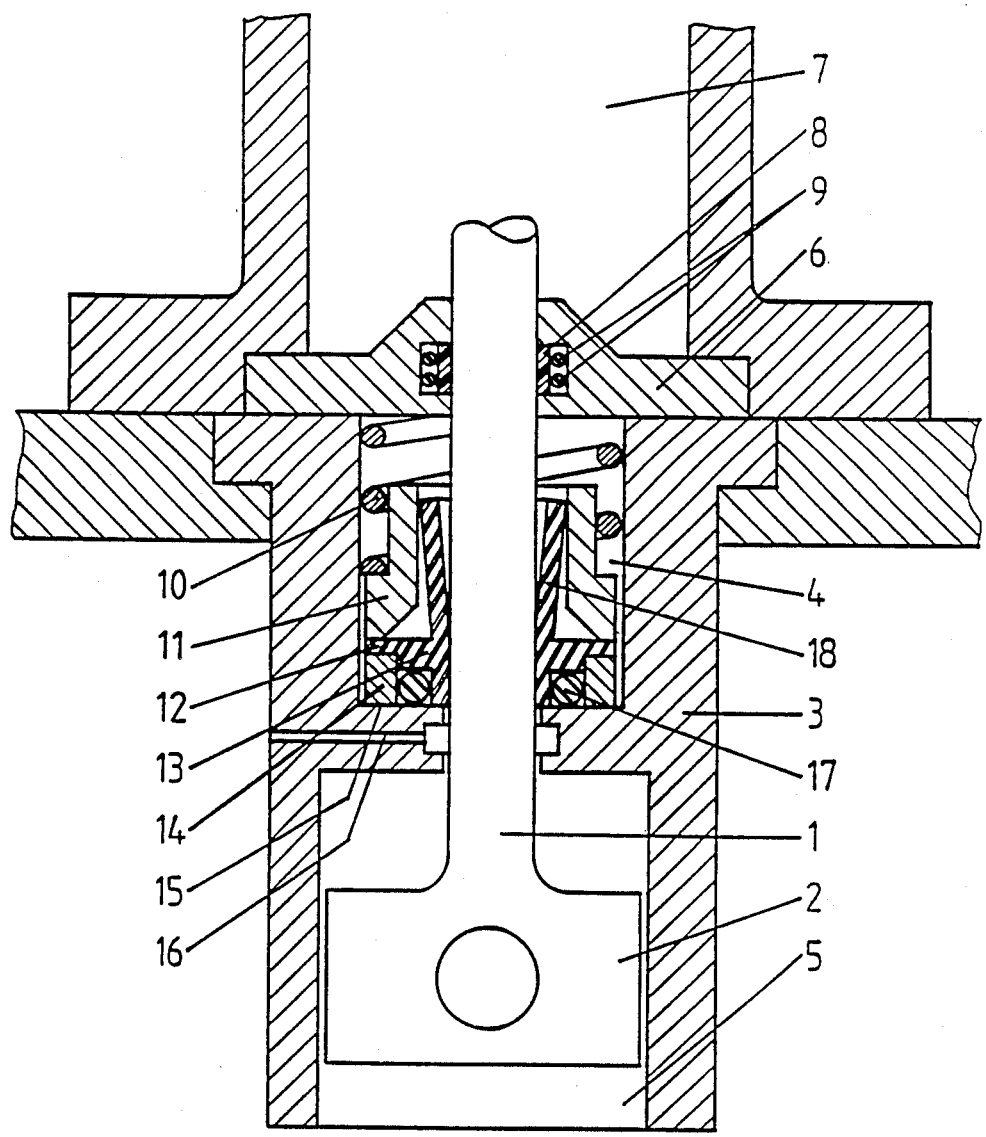

PISTON ROD SEAL

This application is a continuation of application Ser. No. 030,614, filed Mar. 27, 1987, abandoned.

BACKGROUND OF THE INVENTION

1. Field of the Invention

This invention relates to a piston rod seal.

More particularly the invention relates to a piston rod seal of the type comprising a plastically deformable gland adapted to surround a reciprocating piston rod which is passed through an opening in a wall separating a high pressure gas chamber from a low pressure gas chamber, means for supplying oil to the piston rod at the low pressure side of said wall, said gland being axially compressed by a spring located at the high pressure side of the wall, said gland being provided with a conical part diverging slightly from the piston rod in the direction towards the high pressure side of the seal.

2. Description of the Prior Art

A seal of this type has been disclosed in the U.S. Patent Specification No. 4,251,081. In said known device the gland is axially compressed through conical elements providing a radial, inwardly directed force on the gland towards the piston rod.

However, the piston rod—leakage along which should be prevented—is normally guided at its two ends, one of which is carrying a piston whereas the other is carrying a cross-head. The structure providing this guiding of the two piston rod ends will unavoidably allow small traverse movements of the piston rod relative to the axis of the opening in the wall through which the rod is passed. However, any traverse relative movements of the conical surfaces through which the axial force on the gland is transmitted will cause unwanted gas leakage.

SUMMARY OF THE INVENTION

The object of the present invention is to provide a piston rod seal allowing small radial relative movements of the piston rod and the opening of the wall through which the rod is passed without detrimentally influencing the sealing effect.

Another object is to provide a seal which is of smaller axial dimension and which is cheaper to manufacture. These and other objects may be obtained by a seal of the type referred to above which according to the invention is characterized in that said gland is surrounded by a cylindrical metal sleeve and that an O-ring is located between said gland, said sleeve and a shoulder surface of the opening of said wall through which the piston rod is passed.

BRIEF DESCRIPTION OF THE DRAWING

The invention will be described in more detail reference being made to the drawing schematically showing an axial section of a piston rod seal according to the invention.

DESCRIPTION OF THE PREFERRED EMBODIMENT

In the drawing the reference numeral 1 designates a piston rod the lower end of which is integral with a cross-head 2. Said cross-head 2 is guided in a cross-head guide 3 which forms a part of a wall separating a high pressure gas chamber 4 from a low pressure gas chamber 5—i.e. a crank casing (not shown). The chamber 4 is partly limited by a cover 6 separating it from another high pressure gas chamber 7. The chamber 7 may contain a piston—not shown—connected to the upper end of the piston rod. The gas pressure in the chamber 7 will normally vary with the movements of the piston which may be a part of an engine or of a pump. The piston rod 1 is passed through an opening in the cover 6 and is sealed relative thereto by a conventional seal comprising a plastic gland 8 and two O-rings 9. Said seal is of conventional type and serves to maintain a uniform gas pressure in the chamber 4. The seal 8 could be omitted and in such case the pressure in the chamber 4 will vary with the pressure in the chamber 7.

The chamber 4 contains a compression spring 10 being prestressed between the cover 6 and a spring support 11 which bears against a flange 12 of a gland 13 made of plastic material. Said flange 12 bears against a metal sleeve-ring 14 resting on a shoulder surface 15 on the cross-head guide 3 which forms a part of the limiting walls defining the opening through which the rod 1 is passed. The contacting surfaces between the spring support 11, the flange 12 and the ring 13 are planar and extend in directions perpendicular to the axis of the rod 1.

An oil channel 16 is provided for supplying a flow of lubricating oil to the lower part of the rod 1. Said oil will form a thin layer of oil on the rod 1 and during the oscillating movements of the rod 1 the layer of oil will be drawn with the rod 1 into an extremely small gap between the gland 13 and the rod 1. The oil film on the rod 1 will form a very effective seal preventing leakage of high pressure gas from the chamber 4 to the chamber 5 along the outside of the rod 1.

An O-ring 17 is located between the sleeve ring 14, the gland 13 and the surface 15 thus preventing gas from leaking to the chamber 5 via a path between the gland 13 and the wall 3.

The gland 13 is provided with a conical extension 18 diverging upwardly and outwardly. Said conical extension will accumulate any oil passing upwardly through the gland 13. The conical shape will impart a pumping effect on any accumulated oil and return it downwardly through the gland during the reciprocating movements of the rod 1.

The device described and shown will operate as follows.

The gland 13 is fitted tightly around the piston rod, but if the gas to be sealed is a gas having a low molecular weight like hydrogen or helium under high pressure, a film of oil must exist between the rod 1 and the gland 13 in order to block any small grooves found on the contacting surfaces.

During operation the piston 1 will not only be oscillating in the vertical direction, but also will be oscillating, and in directions perpendicular thereto—although only through very small distances—due to the gaps normally existing between the piston (not shown) and the cylinder wall (not shown) as well as between the cross-head 2 and the cross-head guide 3.

As the gland 13 is only clamped between the spring support 11 and the sleeve-ring 14 along a relatively small part—the flange 12—the gland 13 may move transversely with rod 1, without loosing its sealing properties, neither against leakage of gas along the rod 1 nor against leakage at the O-ring 17.

The material used in the gland may be carbon filled or carbon graphite filled polytetrafluoroethylene. The spring 10 may be prestressed to 300N in a device comprising a piston rod of 12 mm diameter used in an engine—e.g. a hot gas engine—having a piston stroke of 40 mm and using hydrogen of 15 MPa mean pressure as a working gas.

The sleeve-ring 14 not only serves to transmit the spring pressure but also to restrict expansion of the plastic material due to increased temperatures during operation. Thus after a period of operation and cooling down of the seal the gland 13 will still remain in a tight contact with the rod 1.

The part of the gland 13 formed by the flange 12 and being clamped between the spring support 11 and the ring 14 is rather small. Preferably the extension in radial direction is less than 25% of the maximum diameter of the flange 12.

What is claimed is:

1. In a piston rod seal of the type having a plastically deformable gland adapted to surround a reciprocating piston rod which is passed through an opening in a wall defining a shoulder separating a high pressure gas chamber from a low pressure gas chamber, means for supplying oil to the piston rod at the low pressure side of the wall, a lower part of said gland being axially compressed by a spring acting through a spring support located at the high pressure side of the wall, said gland being provided with an upper conical part diverging slightly from the piston rod in the direction towards the high pressure side of the seal, the improvement comprising:

said gland lower part having a radially extending flange-portion with opposed axial surfaces, said spring support axially contacting said flange portion on one of said opposed axial surfaces in a defined spring-influenced flange area; a cylindrical metal sleeve-ring surrounding said gland lower part and axially abutting said flange portion on the other of said opposed axial surfaces, said sleeve-ring also being spaced radially from the rod; and an O-ring located between said gland, said sleeve-ring, and the shoulder surface surrounding the opening of said wall through which the piston rod is passed.

2. The piston rod seal claimed in claim 1 wherein said spring-influenced flange area has a dimension in directions perpendicular to the axis of the rod which is less than 25% of the maximum diameter of the gland.

3. The piston rod as claimed in claim 1, wherein said opposed axial surfaces are radially extending planar surfaces.

4. Apparatus for sealing a piston rod reciprocating along an axis and passing through an opening in a wall separating a high pressure gas chamber and a lower pressure chamber, the apparatus comprising:

a plastically deformable gland sealingly and slidingly surrounding the piston rod and having a radially extending flange part with opposed axial surfaces;

spring means for axially contacting said flange at the one of said opposed surfaces distant the wall, for applying a gland capturing force to a defined area of said distant opposed surface;

sleeve-ring means contacting the other of said opposed surfaces at a location radially spaced from the piston rod, for axially transmitting the spring force from said flange to said separating wall for maintaining sealing engagement between said gland and said reciprocating rod during transverse rod motion, wherein said sleeve-ring means also contacts said flange in the radial direction for radially constraining said gland against temperature-inducted dimensional changes; and O-ring means for preventing leakage past said gland and said sleeve-ring means.

5. Apparatus as in claim 4 wherein said flange has an axially stepped larger diameter portion and a smaller diameter portion, wherein said sleeve-ring means radially contacts said flange on the smaller diameter portion, and wherein said other opposing surface which is axially contacted by said sleeve-ring means is located on said larger diameter portion.

6. The apparatus as in claim 4 wherein said gland capturing area has a radial dimension less than about 25% of the maximum flange diameter.

7. The apparatus as in claim 4 wherein said opposing surfaces are substantially planar and perpendicular to the axis of the rod.

* * * * *